G. F. SMITH.
CAR LIGHTING SYSTEM.
APPLICATION FILED JUNE 9, 1919.

1,417,696.  
Patented May 30, 1922.

WITNESSES:  
J. A. Helsel  
W. R. Coley

INVENTOR  
Gerald F. Smith.  
BY  
Wesley G. Carr  
ATTORNEY

UNITED STATES PATENT OFFICE.

GERALD F. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

CAR-LIGHTING SYSTEM.

1,417,696.  Specification of Letters Patent.  Patented May 30, 1922.

Application filed June 9, 1919. Serial No. 302,764.

*To all whom it may concern:*

Be it known that I, GERALD F. SMITH, a citizen of the United States, and a resident of Wilkinsburg, in the county of Allegheny and State of Pennsylvania, have invented a new and useful Improvement in Car-Lighting Systems, of which the following is a specification.

My invention relates to substantially constant-voltage car-lighting systems, and it has for its object to provide a system of this character which shall be relatively simple and inexpensive in construction and effective and reliable in operation.

More specifically stated, it is an object of my invention to provide a motor-generator set for car-lighting purposes having the motor armature energized in accordance with the generator voltage and having the generator armature energized in accordance with the motor current.

Another object of my invention is to provide a system of the type just set forth, in combination with another field winding for the generator that is connected in series relation with an intermittent load, such as the control circuits for the propelling motors or the vehicle head-light.

Figure 1:
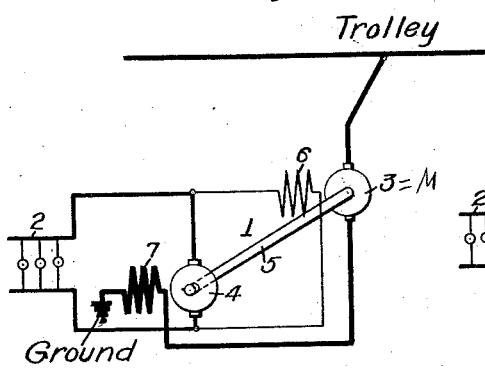
Figure 2:
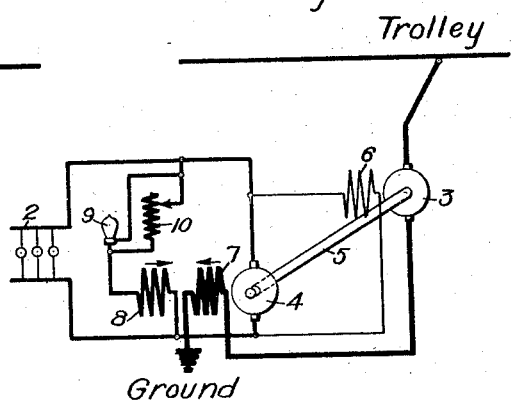
Figure 3:
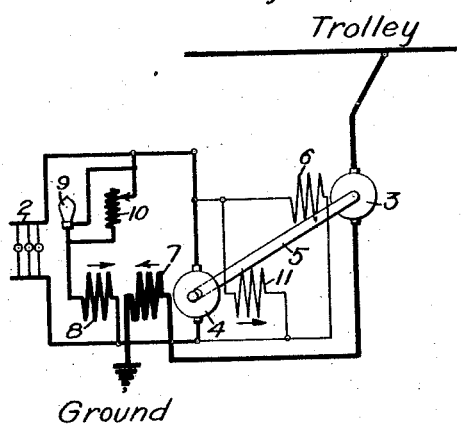
Figure 4:
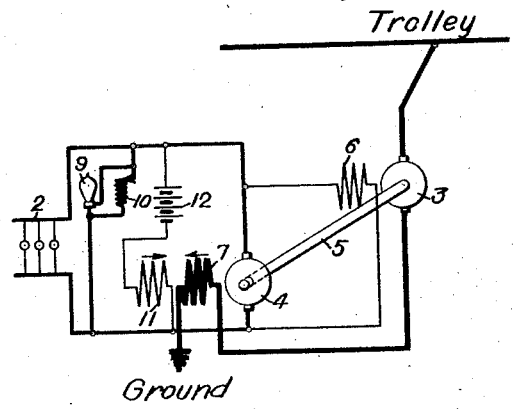

Other objects of my invention will become evident from the following detailed description, taken in conjunction with the accompanying drawing, wherein Figure 1 is a diagrammatic view of the essential circuits of a car-lighting system embodying my present invention, and Figs. 2 to 4, inclusive, are similar views of various modifications thereof.

Referring to Fig. 1, the system here shown comprises suitable supply-circuit conductors trolley and ground, together with a motor-generator set 1 and a load circuit 2, comprising a set of car lamps that are connected, in multiple, across the generator armature of the motor-generator set.

The motor-generator set 1 comprises a motor armature 3 and a generator armature 4 which are mechanically connected, as by a shaft 5. A field winding 6 for the motor armature 3 is connected across the brushes of the generator armature 4 to be energized in accordance with the voltage thereof, while a field winding 7 for the generator is connected in series relation with the motor armature 3 to be energized in accordance with the current traversing that armature.

The magnetic circuit for the generator has a relatively low degree of saturation and, consequently, the illustrated system will provide a substantially constant voltage to the car lamps 2 as long as the load is practically constant.

In Fig. 2, the same same circuits are illustrated and, in addition, a differentially-acting field winding 8 for the generator armature 4 is connected in series relation with an intermittent load, such as the vehicle headlight 9 and a resistor 10 which represents the auxiliary control system for the car-propelling motors or the like. The differential arrangement of the field windings 7 and 8 for the generator is indicated by the corresponding arrows.

The addition of the intermittent load 9, 10 alone in the system of Fig. 2 would cause an increase in the load current traversing the motor armature 3 and, therefore, the generator field winding 7. Such action would tend to cause the generator voltage to increase, but the differential action of the field winding 8 serves to neutralize such increase of current in the field winding 7, whereby the desired steady generated voltage is maintained.

In Fig. 3, a shunt field winding 11 for the generator armature 4 is connected differentially with respect to the field winding 7, thereby assisting the differential action of the field winding 8 and maintaining a very steady delivered voltage, especially during periods of low line voltage.

With the connections as illustrated, an incipient increase in the generator voltage causes an augmented current to flow through the field winding 11 which, by reason of its differential connection, serves to reduce the total effective flux for the generator armature and thus decrease the voltage thereof to the desired average value. The converse action takes place in the event of an incipient decrease of generator voltage, as will be understood.

In the system shown in Fig. 4, the headlight 9 and the variable resistor 10 are connected directly across the generator terminals, while the field winding 11 is differentially connected in series relation with a storage battery 12 also across the generator. The connections are otherwise as shown in Fig. 2.

It will be understood that the illustrated connection of the storage battery, together with the differential effect of the field winding 11, serves to steady the generator voltage under conditions of variable or intermittent load, as reflected in the current traversing the field winding 7.

It will be seen that I have thus provided a relatively simple car-lighting system wherein a substantially constant lamp voltage is inherently maintained, irrespective of fluctuations of line voltage or load.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. A substantially constant-voltage lighting system comprising a direct-current motor-generator set having a field winding for the motor connected to the generator brushes and having a field winding for the generator connected in series relation with the motor armature, the generator magnetic circuit having a relatively low degree of saturation.

2. A substantially constant-voltage lighting system comprising a motor-generator set having the motor armature energized in accordance with the generator voltage and having the generator armature energized in accordance with the motor current, and an intermittent load, an additional field winding for the generator being differentially energized in accordance with said intermittent load.

3. A substantially constant-voltage lighting system comprising a direct-current motor-generator set having a field winding for the motor connected to the generator brushes and having a field winding for the generator connected in series relation with the motor armature, and an intermittent load connected to the generator armature, another field winding for the generator being differentially connected in series relation with said load.

4. A substantially constant-voltage lighting system comprising a motor-generator set having the motor armature energized in accordance with the generator voltage and having the generator armature energized in accordance with the motor current, and an intermittent load, additional field windings for the generator being differentially energized in accordance with the intermittent load and the generator voltage, respectively.

5. A substantially constant-voltage lighting system comprising a direct-current motor-generator set having a field winding for the motor connected to the generator brushes and having a field winding for the generator connected in series relation with the motor armature, and an intermittent load connected to the generator armature, other field windings for the generator being differentially connected to the generator brushes and in series relation with said load, respectively.

In testimony whereof, I have hereunto subscribed my name this 29th day of May 1919.

GERALD F. SMITH.